April 14, 1964     F. DETERMANN     3,129,275
PHOTOGRAPHIC FINDER WITH IMAGE DEFINING FRAME Filed April 3, 1962     3 Sheets-Sheet 1

INVENTOR
FRITZ DETERMANN
BY: Blum, Moscovitz, Friedman and Blum
Attorneys

April 14, 1964    F. DETERMANN    3,129,275
PHOTOGRAPHIC FINDER WITH IMAGE DEFINING FRAME
Filed April 3, 1962    3 Sheets-Sheet 2

INVENTOR
FRITZ DETERMANN
BY: Blum, Moscovitz,
Friedman and Blum

Attorneys

April 14, 1964　　　F. DETERMANN　　　3,129,275
PHOTOGRAPHIC FINDER WITH IMAGE DEFINING FRAME
Filed April 3, 1962　　　　　　　　　3 Sheets-Sheet 3
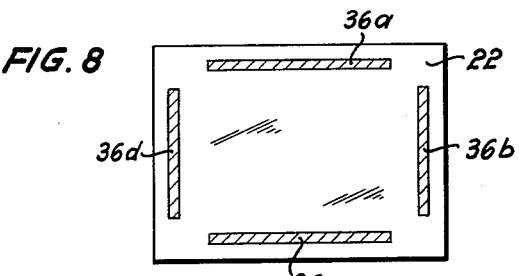
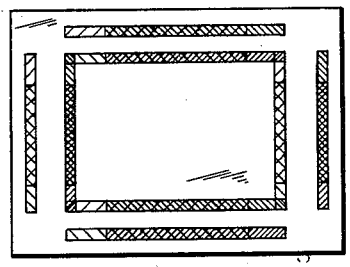
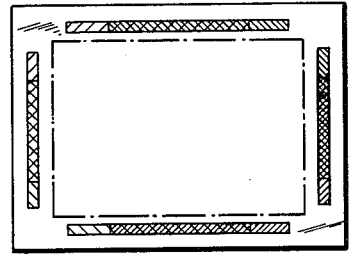
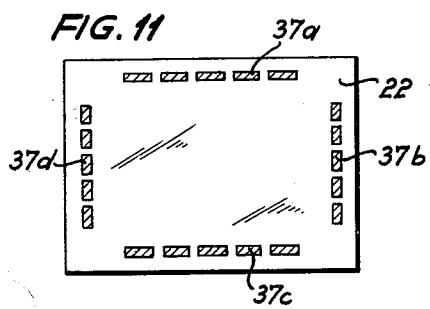
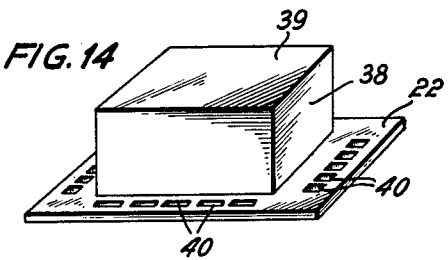
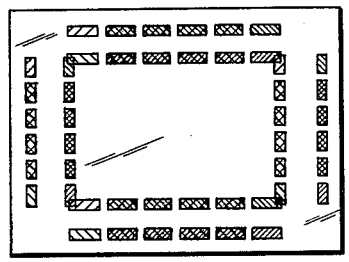
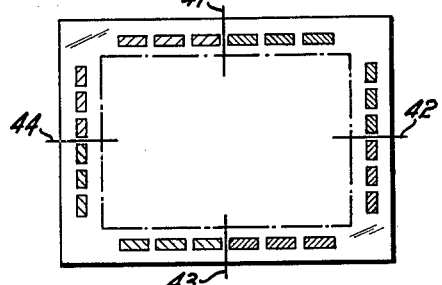
INVENTOR
FRITZ DETERMANN
BY: Blum Moscovitz, Friedman and Blum
Attorneys

3,129,275
PHOTOGRAPHIC FINDER WITH IMAGE DEFINING FRAME
Fritz Determann, Braunschweig, Germany, assignor to Voigtlander A.G., Braunschweig, Germany, a corporation of Germany
Filed Apr. 3, 1962, Ser. No. 184,807
Claims priority, application Germany Apr. 24, 1961
4 Claims. (Cl. 88—1.5)

This invention relates to photographic finders in which defining or framing of the field of view is provided by light rays passing through transparent portions of an otherwise opaque plate mounted in a light ray path which is separate from the main light ray path of the finder, and with the light rays providing a field framing image, in the field of view of the finder, through the medium of a partially light permeable mirror positioned in the main light ray path through the finder. More particularly, the present invention is directed to a novel, compact, and efficient photographic finder of this type.

Photographic finders of this type are known to the art and are extensively used. As the image defining or framing field of view is provided by light rays entering along a path which is disposed laterally of the main light ray path of the finder, this requires a second similar window, adjacent the finder window, for example in the front wall of the hood or cover of the camera, the illumination for the field framing image entering through the second window.

In the past, greatly reduced finder images were acceptable but, with modern cameras, it is desirable to provide a magnification of the finder image to approach as near as possible a ratio of 1:1. This is desirable not only for the sake of convenience but also to allow the most exact possible identification of the image which will be photographed by the field lens of the camera. However, in thus enlarging the finder image, it is also necessary to enlarge the dimensions of the finder window as well as enlarging the dimensions of such second window, this being necessary because of the limited depth of the construction and the quite considerable brightness of the framing image. With the relatively small overall dimensions of modern cameras, and the compact design of the mechanisms included in the camera and particularly in the hood or cover thereof, there simply is no space available for two large windows, for the finder and for illuminating the image frame. Furthermore, it is frequently the case that two such relatively large windows aesthetically impair the appearance of the camera as well as making the camera relatively unwieldy.

The object of the present invention is to obviate these adverse features and disadvantages encountered when it is attempted to provide as large a magnification as possible of the finder image.

In accordance with the present invention, the aforementioned adverse features and disadvantages are obviated by virtue of providing, in the path of light rays delineating the frame mark or markings, an optical element, such as a lens, which has a light condensing surface portion, effective to magnify the image of the frame markings, and a pyramidal surface portion. The magnifying surface portion preferably faces the optical element, such as an opaque plate having light transmitting portions, providing the frame markings. The pyramidal surface preferably faces the partially light permeable mirror disposed in the main path of rays through the finder, and thus, in effect, is directed toward the eye of a viewer. The pyramidal faces of this lens separately image the frame markings with some displacement and in such a manner that the common border of the relatively displaced marking images defines an enlarged image of the markings. Means, such as a second opaque plate similar in general outline to the frame to be magnified, is provided, preferably downstream along the path of light rays passing through the first opaque plate, to mask the partial frame marking images disposed inside the common border so that only this border appears as an image in the field of view of the finder.

For an understanding of the principles of the invention, reference is made to the following description of typical embodiments thereof as illustrated in the accompanying drawings. In the drawings:

FIG. 8 is a view, similar to FIG. 5, illustrating another arrangement of frame markings;

FIGS. 9 and 10 are views, similar to FIGS. 6 and 7, illustrating the images of the markings of FIG. 8;

FIG. 11 is a view similar to FIGS. 5 and 8 illustrating a third arrangement of frame markings;

FIGS. 12 and 13 are views, similar to FIGS. 6, 7, 9 and 10, illustrating the images of the frame markings shown in FIG. 11; and FIG. 14 is a perspective view of a modified form of frame marking device in accordance with the invention.

Figure 1:
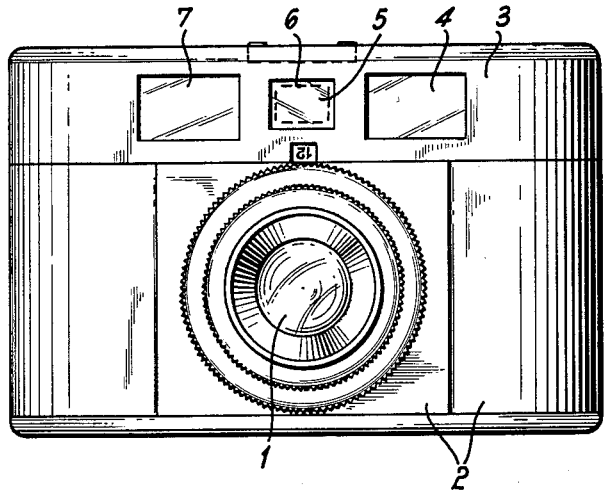
FIG. 1 is a front elevational view of a conventional still picture camera.

Referring to FIG. 1, a conventional camera for taking still pictures is illustrated as including an objective lens 1 supported by a casing or housing 2 having a cover or hood 3 in which is positioned a finder window 4 and a frame window 5 having the frame markings 6 traced out thereon. A third window 7 can be provided for admitting light to the photoelectric cell of an electrical exposure meter. Normally, an image of the frame markings 6 is provided in the light ray path of the dioptric viewfinder 10—11 through the intermediary of two mirrors 8 and 9 having a magnifying lens positioned between them.

A standard construction of this type provides some magnification of the frame markings, so that the marking dimensions, as well as the light entry window 5, must be made somewhat smaller than the dimensions of the viewfinder window 4. However, owing to the nature of the mechanism found inside the camera hood or cover 3, as well as other structural parts therewithin, it is impossible, in many instances, to provide markings or mask 6, and a window 5 associated therewith, which have the necessary or requisite dimensions for the finder. In such instances, the only recourse is to proportion both the frame mark 6 and the window 5 to be substantially smaller than the finder window 4. In these instances, not only is the magnification of the frame image insufficient to attain the ratio of about 1:1, but also, to effect the required magnification of the frame image by conventional means, would require an unacceptable increase in the cost of the finder, or an increase in dimensions of the finder such that it cannot feasibly be located in a camera considering the relatively compact and crowded nature of the construction of modern cameras.

Figure 2:
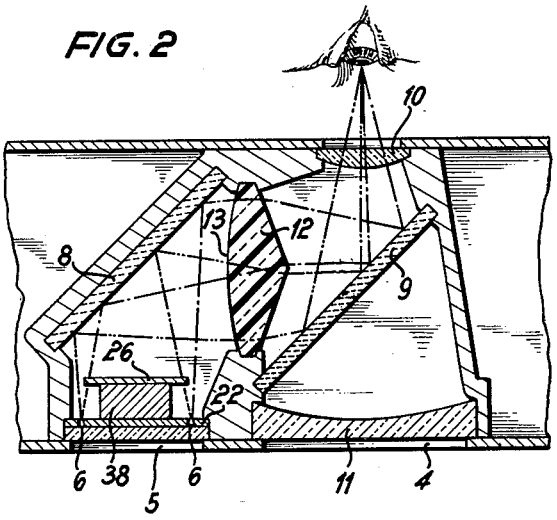
FIG. 2 is a horizontal sectional view illustrating the path of light rays providing an image of frame markings in the field of view of a finder, and embodying the present invention.
Figure 3:
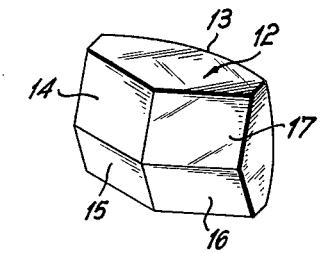
FIGS. 3 and 4 are perspective views of the optical means, or lens, provided in accordance with the present invention.
Figure 4:
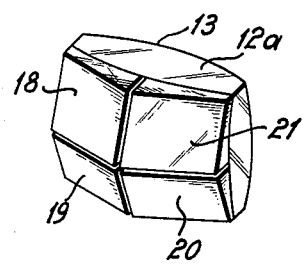

In accordance with the present invention, the solution to these difficulties has been found in the use of a light transmission member which is designed as a "four-wedge" lens 12, and examples of which are shown in FIGS. 3 and 4 in perspective views, with FIG. 2 illustrating the lens in side elevation. Referring to FIG. 3, one surface of the optical member 12 is designed as a light condensing surface 13, and this surface faces the frame markings. The other surface of the member 12, which faces toward the finder itself, is of a pyramidal shape with four planar surfaces 14, 15, 16 and 17. Owing to the wedge effect of each of these four pyramidal faces, the frame markings are imaged four times in the main path of light rays through the finder, with the images being relatively displaced by a value corresponding to the height of the pyramid.

Fundamentally, the optical element or lens 12 of the invention can be formed of any light transmitting and refracting material. As an example of a particularly economical way of producing the member 12, the latter may be molded or cast as an integral structural part from suitable plastic material. However, under some circumstances, it may be expedient to make the element 12 of a number of parts, which may be made of different materials. Thus, and as best seen in FIG. 4, the optical element may have a glass unit 12a to which is cemented a plurality of transparent plastic blocks 18, 19, 20 and 21 providing the pyramidal faces 14, 15, 16 and 17.

Figure 5:
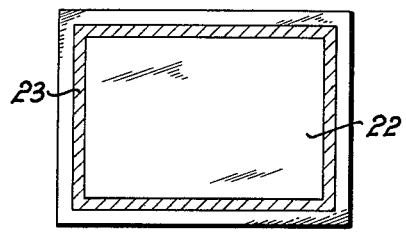
FIG. 5 is a plan view of the opaque plate providing the frame markings by transparent portions thereof.
Figure 6:
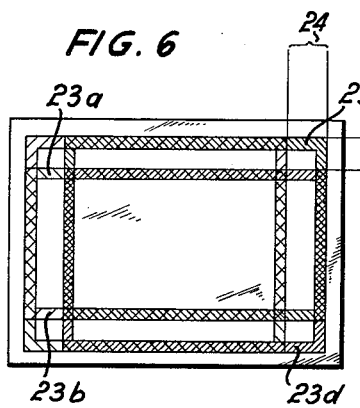
FIGS. 6 and 7 are views illustrating the images of the frame markings as provided by the plate shown in FIG. 5 in association with the optical means of FIGS. 3 and 4.

If a frame plate 22, with frame markings 23, as shown in FIG. 5, is used behind the mask window 5, the reflected image of the markings will appear in the field of view of the finder in accordance with the illustration in FIG. 6. It will be noted that this composite image comprises four reflected images 23a, 23b, 23c, and 23d, with the common border of all four images having lateral dimensions exceeding the corresponding dimensions of the frame markings 23 by the values indicated at 24 and 25. Since those parts of the frame image appearing within the common outer border would have a disruptive effect when seen through the finder, an opaque cover plate 26 (FIG. 2) is positioned behind the frame plate 22 at such a distance that it will mask the middle portions of the images or the major part of those images included within the common border. Hence, and as best seen in FIG. 7, only a magnified image of the frame is visible in the finder.

Figure 7:
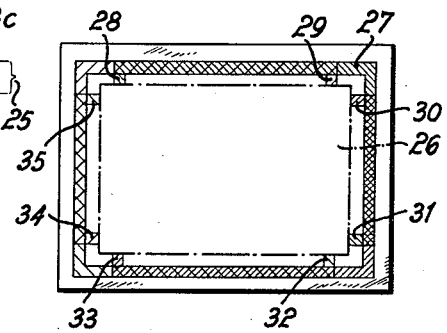

Since, in actual practice, the cover or masking plate 26 is outside the focal plane of the viewfinder system, and as it is likewise displaced in the image of the finder upon movement of the eye of the viewer, as shown in FIG. 7 the remaining parts 28 through 35 of the masked frame parts are visible. These parts have been found to be unsightly and distracting.

Accordingly, in accordance with the invention, resort is had to a frame marking as shown in FIG. 8. In this embodiment of the invention, the frame plate 22 is provided with four rectilinear frame markings 36a, 36b, 36c, and 36d which extend along four sides of a rectangle, and which frame markings do not meet at the corners of the rectangle. Fig. 9 illustrates the images of the frame markings shown in FIG. 8, as these appear in the finder and, after masking of those portions of the image within the common border, by means of the cover plate or masking plate 26, only the common border, such as shown in FIG. 10, appears as a field-delineating image in the finder.

With the four-fold imaging provided by the planar faces 14, 15, 16 and 17 of the pyramidal lens, discontinuities between the individual images forming the composite field frame image are apt to appear at the adjoining edges of the planar faces. To obviate this deleterious phenomenon, in accordance with the invention the frame markings are arranged, as shown in FIG. 11, as broken lines 37a, 37b, 37c and 37d. With this arrangement, the broken lines of the frame can be placed on the plate 26 in such a manner that, after the four-fold imaging provided by the pyramidal lens, the interstitial spaces of the broken lines are precisely coincident with seams or breaks between the individual frame images, while the staggering of the images, by virtue of the pyramidal faces of the lens, is an exact multiple of a streaking length.

With a frame marking arranging of the type shown in FIG. 11, and before masking out of those portions of the images appearing within the common border, the image of the frame will appear as shown in FIG. 12 and, when the mask or cover plate 26 is applied, the frame image, as seen in the finder, will appear as shown in FIG. 13. As illustrated in FIG. 13, the breaks or streaks between images, such as 41, 42, 43 and 44 will not appear in the usual line of sight of one looking through the finder.

In the arrangement of FIG. 2, the cover or masking plate 26 is connected to the frame masking plate 22 by means of a quadrangular block 38. These three structural parts can be replaced by a single structural part of a shape approximating the part shown in FIG. 14. The single structural part shown in FIG. 14 is preferably formed of a plastic material, and it will be noted that it includes the masking plate 22 having the frame masking openings 40 therein arranged as broken lines as in FIG. 11, with the surface 39 representing the masking or cover plate 26. All surfaces, including those of the openings 40 defining the frame, are blackened so as not to be light reflective.

While the finder arrangement has been described more particularly as applied to a still picture camera, it will be understood that it is equally useful with other types of photographic exposure devices, such as movie cameras for example.

While specific embodiments of the invention have been shown and described in detail to illustrate the application of the principles of the invention, it will be understood that the invention may be embodied otherwise without departing from such principles.

What is claimed is:

1. In a photographic finder of the type including an opaque plate positioned in a light ray path separate from the main light ray path through the finder and having light transmitting portions defining field frame markings, a partially light permeable mirror in the main light ray path, and optical means cooperable with said mirror to provide an image of the markings in the main light ray path: the improvement in which said optical means is a lens having a condensing surface effecting magnification of the images of the markings, and a four-sided pyamidal surface including four plane faces each providing an image of the markings with the respective images being relatively displaced in such a manner that the common border of the relatively displaced images defines an enlarged image of the markings; and means disposed between said opaque plate and said mirror for masking image portions within said common border so that substantially only said common border is visible as a marking image in the main light ray path, said masking means being a second opaque plate mounted in spaced parallel relation to the first opaque plate in the path of light rays passing through the light transmitting portions of said first opaque plate and downstream, with respect to the direction of entering light, from the first opaque plate; said second opaque plate having a periphery similar to that of said common border.

2. In a photographic finder, the improvement defined in claim 1, in which said lens comprises five elements cemented together, one of said elements having said condensing surface and the other four of said elements conjointly forming said pyramidal surface and each having one of said plane faces; said one element being composed of glass and said other four elements being molded of a transparent plastic composition material.

3. In a photographic finder, the improvement defined in claim 1, in which said markings comprise four lines extending along the four sides of a rectangle but each terminating short of a corner of the rectangle.

4. In a photographic finder, the improvement defined in claim 3 in which said lines are discontinuous broken lines.

References Cited in the file of this patent
UNITED STATES PATENTS

| | | |
|---|---|---|
| 1,501,979 | Willson | July 22, 1924 |
| 2,423,718 | Morrison | July 8, 1947 |
| 2,525,558 | Mihalyi | Oct. 10, 1950 |
| 2,969,706 | Rosier et al. | Jan. 31, 1961 |
| 3,029,720 | Leitz et al. | Apr. 17, 1962 |
| 3,076,397 | Briskin et al. | Feb. 5, 1963 |

FOREIGN PATENTS

| | | |
|---|---|---|
| 927,418 | Germany | May 9, 1955 |